UNITED STATES PATENT OFFICE.

EDWIN STANTON FAUST, OF BASEL, SWITZERLAND.

DERIVATIVES OF CAMPHORIC ACID.

1,406,547.      Specification of Letters Patent.      Patented Feb. 14, 1922.

No Drawing.      Application filed October 8, 1920. Serial No. 415,576.

*To all whom it may concern:*

Be it known that I, EDWIN STANTON FAUST, a citizen of the United States of America, and resident of Basel, Switzerland, have invented new and useful Derivatives of Camphoric Acid, of which the following is a full, clear, and exact specification.

The general use of camphor in medical practice, especially for injection purposes, encounters the difficulty that it is very sparingly soluble in water.

The attempts to substitute for camphor such derivatives having its valuable and characteristic therapeutical properties and being easily soluble in water as well as resistant to heat and thus injectable subcutaneously and intravenously in sterile condition, have not given up to the present the desired results.

I have found that these desired properties appertain to certain N-substituted derivatives of the camphoric-acidimide of the formula:

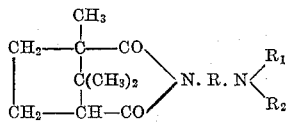

wherein R represents an alkyl or an alkylene, $R_1$ and $R_2$ hydrogen, an alkyl or an alkylene.

These bodies hitherto unknown, can, according to my invention, be prepared by methods analogous to those which are used for the preparation of corresponding derivatives of other dicarbonic acids, both of the aliphatic and of the aromatic series. Thus, it is possible to treat, for example, the imide of camphoric acid, whether in form of the isolated dry salts or in alcaline solution, with at least doubly halogenized, saturated or unsaturated aliphatic hydrocarbons or halogenhydrines and to subject the resulting N-halogen-alkyl- or N-halogen-alkylene- imides of camphoric acid to the action of ammonia or alkyl- or alkylene substituted amines. In an analogous manner, camphoric acid or camphoric acid anhydride can be treated with diamines of the formula $H_2N-R-N\ R_1\ R_2$, wherein R represents an alkyl or an alkylene, $R_1$ and $R_2$ hydrogen, an alkyl or an alkylene.

The new compounds yield with acids colorless, crystalline salts which are soluble in water and alcohol, but are insoluble in ether. They possess all the therapeutically valuable and desired properties of camphor.

*Example 1.—Beta-aminoethyl-imide-bromhydrate of camphoric acid.*

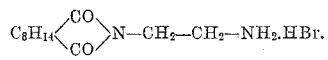

11.5 parts of metallic sodium are dissolved in 250 parts of absolute alcohol. The ethylate solution is mixed with 90.5 parts of imide of d-camphoric acid and 90 parts of glycoliodhydrine and boiled on the waterbath until the reaction becomes neutral (curcuma). The alcohol is then evaporated, the remaining mass mixed with 100 parts of soda lye of 30 per cent and washed with ether.

The thus obtained oxyethyl-imide of camphoric acid is distilled off in vacuo. It boils at 190° C. under a pressure of 15 mm. and constitutes a colorless thick oil.

9 parts of beta-oxyethyl-imide of camphoric acid are dissolved in 50 parts of chloroform and mixed in portions with 8.3 parts of phosphorus pentachloride. After heating for half an hour on the water-bath the chloroform and phosphorus oxychloride are distilled off in vacuo and the remaining mass, after having been washed with ice-water, is fractionally distilled. At 168° C. under a pressure of 10.5 mm. the chlorethyl-imide of camphoric acid passes over in the form of a slightly yellowish coloured oil.

10 parts of beta-chlorethyl-imide of camphoric acid are heated with 100 parts of 15 times normal aqueous ammonia in a sealed tube, while being frequently shaken, for 3 hours to 100° C. The clear solution is evaporated, mixed with soda lye and washed several times with ether. The dried ethereal solution, when alcoholic hydrobromic acid is added thereto, results in the precipitation of the bromhydrate of beta-aminoethyl-imide of camphoric acid in form of a syrup, which becomes solid only very slowly and incompletely. The dried salt melts at 135 to 140° C. under decomposition.

*Example 2.—Beta-dimethylaminoethyl-imide-bromhydrate of camphoric acid.*

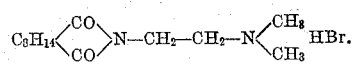

10 parts of beta-chlorethyl-imide of camphoric acid are heated with 20 parts of an aqueous solution of dimethylamine of 33 per cent during 3 hours to 120–125° C. The beta-dimethylamino-ethyl-imide of camphoric acid obtained by washing with ether, boils at 163° C under a pressure of 14 mm. The bromhydrate, recrystallized from ethylacetate and alcohol, constitutes shining needles melting at 207° C., which are easily soluble in water and alcohol.

*Example 3.—Beta-diethylaminoethyl-imide-bromhydrate of camphoric acid.*

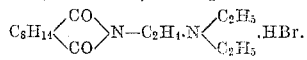

1 molecule of camphoric acid potassium-imide is heated with 3 molecules of ethylenedibromide on the reflux cooler in the oil-bath, the excess of ethylenedibromide serving as solvent and diluent. After several hours the reaction is complete. After the reaction-mass has been cooled down to about 100° C. the excess of ethylenedibromide is blown off (by means of an air-current). The remaining mass is then dissovled in hot alchohol and separated from the diethylenediimide of camphoric acid formed. The betabromethylimide of camphoric acid remaining in the alcohol is distilled off under reduced pressure. Its boiling-point is 186° C. under a pressure of 12 mm.

For the purpose of transforming it into the N-alkamine, I heat in the autoclave 1 molecule of the thus obtained beta-bromethyl-imide of camphoric acid with 2 molecules of diethylamine to about 100° C. The remaining oil is liberated from diethylaminobromhydrate by shaking with water. The remaining oil is distilled off under reduced pressure. The beta-diethylaminoethyl-imide of camphoric acid passes over at 183–185° C. under a pressure of 12 mm. in the form of a thick viscous oil. By means of alcoholic hydrobromic acid, there may be obtained therefrom the bromhydrate, which crystallizes out of ethylacetate and alcohol in form of big, coarse crystals melting at 157° C. and soluble in water and alcohol, but insoluable in ether.

*Example 4.—Beta-allylaminoethyl-imide-bromhydrate of camphoric acid.*

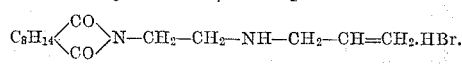

10 parts of allylamine and 20 parts of beta-chlor-ethylimide of camphoric acid are heated in a sealed tube for 3 hours to a temperature of 120–125° C. The contents of the tube are dissovled in water, rendered alcaline and washed with ether. Under a pressure of 12 mm. beta-allylaminoethyl-imide of camphoric acid boiling at 187° C. can be distilled off from the beta-diallylaminoethyl-imide of camphoric acid. The former constitutes a viscous oil having the odour characteristic of allyl compounds.

By addition of alcoholic hydrobromic acid the base can be transformed into the hydrobromide, which, when recrystallized from ethylacetate and alcohol, constitutes fine platelets, melting at 144° C. and very easily soluble in water and alcohol.

*Example 5.—Beta diethylaminoethyl-imide-chlorhydrate of camphoric acid.*

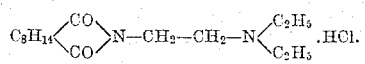

45 parts of the diethylaminoacetonitrile resulting from the interaction of potassium-cyanide, formaldehyde and diethylamine are dissolved in 600 parts of absolute alcohol. While violently stirring and heating in the oil bath, there are added rather rapidly 150 parts of sodium. Then, 100–200 parts of alcohol are further added till the sodium is completely dissovled. The reaction-mass is then mixed with water and treated with steam, until the distillate no longer shows alcaline reaction. The distillate is acidified and evaporated. Out of the residue, on addition of soda lye, the asymmetric diethylethylenediamine separates out in the form of an oil. The base is distilled off over sodium. Its boiling point is 140–150° C. It constitutes a liquid, fuming in contact with the air and having strong basic properties.

12 parts of asymmetric diethylethylenediamine and 20 parts of camphoric acid are slowly heated in a glassbulb armed with a short vertical glass-tube in the oil bath to 180–200° C. After one and a half hours the vertical tube is removed and after a further half hour I proceed to distill fractionally in vacuo. The base thus obtained corresponds in its properties to that described in Example 3. It is dissovled in ether and mixed with alcoholic hydrochloric acid, whereupon the chlorhydrate separates out. After recrystallization from ethylacetate, it is obtained in form of bright shining rectangular crystals whose melting point is 89–90° C. They are very easily soluble in water and alcohol.

*Example 6.—Bata-piperidylethyl-imide-bromhydrate of camphoric acid.*

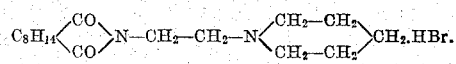

I obtain from piperidinacetonitrile by means of sodium and alcohol; omega-amino-N-ethyl-piperidine, already described by Gabriel (B. 24, p. 1121), boiling at 183–184° C.

13 parts of this amine and 20 parts of camphoric acid are brought to reaction at 180–200° C. as described above. The product is dissovled in a little alcohol and diluted with a good deal of ether, whereby a small quantity of resinous substance is precipitated. The decolorized and filtered etheric solution is treated with alcoholic hydrobromic acid, the precipitated salt sucked off and recrystallized from ethylacetate and alcohol. The hydrobromide constitutes fine, entangled needles, easily soluble in water; melting point 193.5° C.

What I claim is:—

1. As new products, the herein described derivatives of camphoric acid of the formula:

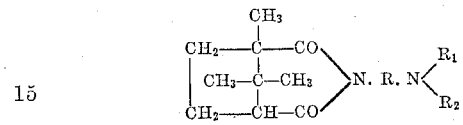

(R being an alkyl or alkylene, $R_1$ and $R_2$ representing hydrogen, an alkyl or alkylene), which constitute in the free state, as bases, viscous oils capable of being distilled in vacuo without decomposition and forming salts with acids; the latter being colorless, solid crystallized compounds, soluble in water and alcohol, insoluble in ether.

2. As a new product, the beta-diethylaminoethyl-imide-chlorhydrate of camphoric acid of the formula:

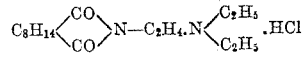

which constitutes colorless, shining crystals, melting at 89–90° C. and being very easily soluble in water and alcohol.

In witness whereof I have hereunto signed my name this 24th day of September, 1920, in the presence of two subscribing witnesses.

EDWIN STANTON FAUST.

Witnesses:
WILLIAM E. HOLLAND,
ANDREW PRANN.